United States Patent
Potnis et al.

(10) Patent No.: US 12,093,137 B2
(45) Date of Patent: Sep. 17, 2024

(54) SYSTEM AND METHOD FOR DATA BACK-UP USING A PROXY POOL

(71) Applicant: Druva Inc., Sunnyvale, CA (US)

(72) Inventors: Ajay Potnis, Pune (IN); Milind Vithal Borate, Pune (IN); Sudeep Jathar, Pune (IN); Prahlad Nishal, Pune (IN); Somesh Jain, Pune (IN); Nishant Thorat, Pune (IN)

(73) Assignee: Druva Inc., Santa Clara, CA (US)

( * ) Notice: Subject to any disclaimer, the term of this patent is extended or adjusted under 35 U.S.C. 154(b) by 155 days.

(21) Appl. No.: 17/232,900

(22) Filed: Apr. 16, 2021

(65) Prior Publication Data

US 2022/0197756 A1 Jun. 23, 2022

(30) Foreign Application Priority Data

Dec. 17, 2020 (IN) .............................. 202041054889

(51) Int. Cl.
*G06F 11/14* (2006.01)
*G06F 9/50* (2006.01)

(52) U.S. Cl.
CPC ........ *G06F 11/1464* (2013.01); *G06F 9/5083* (2013.01); *G06F 11/1451* (2013.01); *G06F 2201/84* (2013.01)

(58) Field of Classification Search
CPC ............... G06F 11/1464; G06F 9/5083; G06F 11/1451; G06F 2201/84
See application file for complete search history.

(56) References Cited

U.S. PATENT DOCUMENTS

| 2016/0055612 | A1* | 2/2016 | Barik ........................ G06F 3/14 345/522 |
| 2017/0220281 | A1* | 8/2017 | Gupta ................... G06F 3/0604 |
| 2019/0087282 | A1* | 3/2019 | Kumar ................ G06F 11/2094 |
| 2019/0102232 | A1* | 4/2019 | Wang ...................... G06F 9/505 |
| 2020/0404044 | A1* | 12/2020 | Dey ....................... H04L 67/141 |
| 2021/0011627 | A1* | 1/2021 | Sridharan ............. G06F 3/0619 |
| 2021/0149718 | A1* | 5/2021 | Doddaiah ............. G06F 9/4881 |
| 2021/0390495 | A1* | 12/2021 | Upadhyay ............. G06F 9/5016 |

* cited by examiner

*Primary Examiner* — Mark D Featherstone
*Assistant Examiner* — Tony Wu
(74) *Attorney, Agent, or Firm* — IceMiller LLP

(57) ABSTRACT

A data back-up system configured to back-up one or more data sets from one or more devices to a data back-up server by using a proxy pool is presented. The data back-up system includes a load-balancer configured to distribute the one or more data sets across the proxy pool. The load balancer includes a data receiver configured to receive types of files, number of files, and total size of each file in the one or more data sets; a load estimator configured to estimate a weighted average load of each data set based on the number of files, the total size of each file, a compressibility factor for each file type, and an encryption factor for each file type; and a load distributor configured to distribute the one or more data sets as a plurality of workloads across the proxy pool.

20 Claims, 8 Drawing Sheets

| FILE NAME | FILE TYPE | SIZE | COMP ABILITY | COMP FACTOR | WEIGHT | COMP WEIGHT | ENCRYPT FACTOR/ WEIGHT | TOTAL WEIGHT | SPLIT WEIGHT |
|---|---|---|---|---|---|---|---|---|---|
| data/1/f1.txt | Text | 1024 | High | 0 | 3 | 0 | 0 | | |
| data/1/f2.txt | Text | 5242880 | High | 5 | 3 | 15 | 5 | | |
| data/1/f3.txt | Text | 5242880 | High | 5 | 3 | 15 | 5 | | |
| data/1/f4.txt | Text | 5242880 | High | 5 | 3 | 15 | 5 | | Proxy 140A |
| data/1/f5.txt | Text | 10737741824 | High | 1024 | 3 | 3072 | 1024 | 12348 | 12348 |
| data/1/f6.txt | Text | 10737741824 | High | 1024 | 3 | 3072 | 1024 | | |
| data/1/f7.txt | Text | 10737741824 | High | 1024 | 3 | 3072 | 1024 | | |
| data/2/f1.zip | Compressed | 5242880 | Low | 5 | 1 | 5 | 5 | | Proxy 140B |
| data/2/f2.gzip | Compressed | 5242880 | Low | 5 | 1 | 5 | 5 | | |
| data/2/f3.jpeg | Compressed | 2147483648 | Low | 2048 | 1 | 2048 | 2048 | 12308 | 12308 |
| data/2/f4.mpeg | Compressed | 4294967296 | Low | 4096 | 1 | 4096 | 4096 | | |
| data/3/f1.dat | Data | 10737741824 | High | 1024 | 2 | 2048 | 1024 | | Proxy 140C |
| | | | | | | | | | 9216 |
| data/3/f2.dat | Data | 2147483648 | High | 2048 | 2 | 4096 | 2048 | 21504 | Proxy 140D |
| data/3/f3.dat | Data | 4294967296 | High | 4096 | 2 | 8192 | 4096 | | 12288 |

FIG. 6

SYSTEM AND METHOD FOR DATA BACK-UP USING A PROXY POOL

PRIORITY STATEMENT

The present application claims priority under 35 U.S.C. § 119 to Indian patent application number 202041054889 filed Dec. 17, 2020, the entire contents of which are hereby incorporated herein by reference.

BACKGROUND

Embodiments of the present invention generally relate to systems and methods for data back-up, and more particularly to systems and methods for data back-up using a proxy pool.

Enterprises these days seek reliable, cost-effective ways to protect the data stored on their computer networks while minimizing impact on productivity. An enterprise might back-up critical computing systems such as databases, file servers, web servers, virtual machines, and so on as part of a daily, weekly, or monthly maintenance schedule. A typical back-up process may use a single proxy to back-up all the files, which may slow down the back-up process. Thus, there is a need for improved back-up systems and methods.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a data back-up system is presented. The data back-up system is configured to back-up one or more data sets from one or more devices to a data back-up server by using a proxy pool including a plurality of proxies. The data back-up system includes a load-balancer configured to distribute the one or more data sets across the plurality of proxies. The load balancer includes a data receiver configured to receive file data corresponding to the one or more data sets from a proxy of the plurality of proxies, wherein the file data comprises types of files, number of files, and total size of each file in the one or more data sets; a load estimator configured to estimate a weighted average load of each data set in the one or more data sets based on the number of files, the total size of each file, a compressibility factor for each file type, and an encryption factor for each file type; and a load distributor configured to distribute the one or more data sets as a plurality of workloads across the plurality of proxies based on the weighted average load of each dataset.

According to another example embodiment, a data back-up system is presented. The data back-up system is configured to back-up one or more data sets from one or more devices to a data back-up server by using a proxy pool including a plurality of proxies. The data back-up system includes a memory storing one or more processor-executable routines; and a processor communicatively coupled to the memory. The processor is configured to execute the one or more processor-executable routines to receive file data corresponding to the one or more data sets from a proxy of the plurality of proxies, wherein the file data comprises types of files, number of files, and total size of each file in the one or more data sets. The processor is further configured to execute the one or more processor-executable routines to estimate a weighted average load of each data set in the one or more data sets based on the number of files, the total size of each file, a compressibility factor for each file type, and an encryption factor for each file type; and distribute the one or more data sets as a plurality of workloads across the plurality of proxies based on the weighted average load of each dataset.

According to another example embodiment, a method for backing-up one or more data sets from one or more devices to a data back-up server using a proxy pool is presented. The method includes receiving file data corresponding to the one or more data sets from a proxy of the plurality of proxies, wherein the file data comprises types of files, number of files, and total size of each file in the one or more data sets. The method further includes estimating a weighted average load of each data set in the one or more data sets based on the number of files, the total size of each file, a compressibility factor for each file type, and an encryption factor for each file type; and distributing the one or more data sets as a plurality of workloads across the plurality of proxies based on the weighted average load of each dataset.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein:

FIG. 6 is a table illustrating a workload distribution across different proxies based on a weighted average load, according to some aspects of the present description.

DETAILED DESCRIPTION OF EXAMPLE EMBODIMENTS

Figure 1:
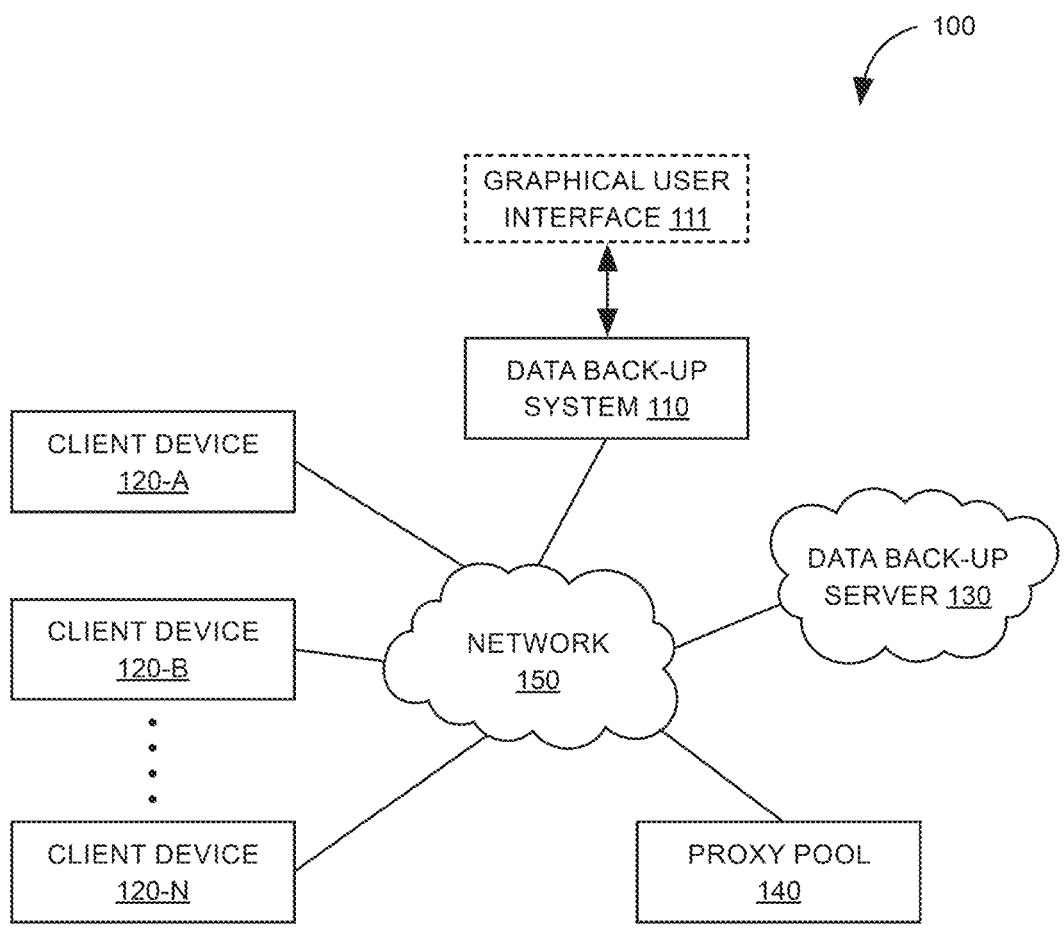
FIG. 1 is a block diagram illustrating an example data back-up system environment, according to some aspects of the present description.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present description provide systems and methods for data back-up using a proxy pool using a load balancing technique. Some embodiments of the present description provide systems and methods for data back-up using a proxy pool by combining a load balancing technique with incremental back-up.

FIG. 1 illustrates an example data back-up system environment 100, in accordance with some embodiments of the present description. The system environment 100 includes a data back-up system 110, one or more client devices 120 (120A, 120B . . . 120N), a data back-up server 130, and a proxy pool 140. The system environment 100 may be configured to back-up data sets from the one or more client devices 120 in the data back-up server 130 using the data back-up system 110 and the proxy pool 140. Examples of data in the data sets to be backed-up include, but are not limited to, a text file, an image file, an audio clip, a video clip, an email, a data file, or any combination thereof.

The data back-up system 110 may be a software or a hardware component that enables the one or more client devices 120 to store and back-up data, and optionally search and access the back-up data. In some embodiments, the data back-up system 110 is a cloud-based service. The data back-up system 110 may optionally further provide graphical user interface 111 for individual clients to access data back-up server 130 for cloud data management. For example, a graphical user interface 111 may be a front-end cloud storage interface. Additionally, or alternatively, the data back-up system 110 may provide APIs for the access and management of files from the data back-up server 130. The data back-up system 110 is configured to back-up one or more data sets from one or more devices 120 to the data back-up server 130 by using the proxy pool 140 including a plurality of proxies.

The one or more client devices 120 (referred to herein as "device") may be any computing devices that have data that may need back-up. Examples of such devices 120 include without limitation, workstations, personal computers, desktop computers, or other types of generally fixed computing systems such as mainframe computers, servers, and minicomputers. Other examples of such devices 120 include mobile or portable computing devices, such as one or more laptops, tablet computers, personal data assistants, mobile phones (such as smartphones), IoT devices, wearable electronic devices such as smart watches, and other mobile or portable computing devices such as embedded computers, set top boxes, vehicle-mounted devices, wearable computers, etc. Servers can include mail servers, file servers, database servers, virtual machine servers, and web servers.

In some embodiments, the data back-up environment 100 includes a plurality of devices 120. The plurality of devices 120 may be from a single client or from different clients being serviced by the data back-up system environment 100 such as shown in FIG. 1. In some embodiments, the data back-up environment 100 includes a single device 120 having a plurality of data sets or one large data set that needs to backed-up.

In some embodiments, the data back-up server 130 is a cloud-based storage. The data sets from the one or more devices 120 may be stored and backed-up in an object-based storage, a file-based storage, or a block-based storage. Non-limiting examples of suitable data back-up server 130 include AMAZON S3, RACKSPACE CLOUD FILES, AZURE BLOB STORAGE, and GOOGLE CLOUD STORAGE.

The system environment 100 further includes the proxy pool 140. The proxy pool 140 is a collection of back-up proxies. In accordance with embodiments of the present description, the back-up requests from the one or more devices 120 are assigned via the data back-up system 110 to proxies within the proxy pool 140 based on a load balancing technique, as described herein detail later. This eliminates the need to map the devices 120 to an individual back-up proxy manually.

The various components in the system environment 100 may communicate through the network 150 and/or locally. For example, in some embodiments, one of the system components may communicate locally with the data back-up system 110, while other components communicate with the data back-up system 110 through the networks. In other embodiments, every component in the system environment 100 is online and communicates with each other through the network 150. In one embodiment, the network 150 uses standard communications technologies and/or protocols. Thus, the network 150 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 150 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

While the data back-up system 110, the data back-up server 130, and the proxy pool 140 are each represented by a single block in FIG. 1, each of these components may include multiple distributed and/or independent computers (may also be referred to as workers) working cooperatively and in parallel with other computers so that the operation of the entire system will not be affected when one or more workers are down.

Figure 2:
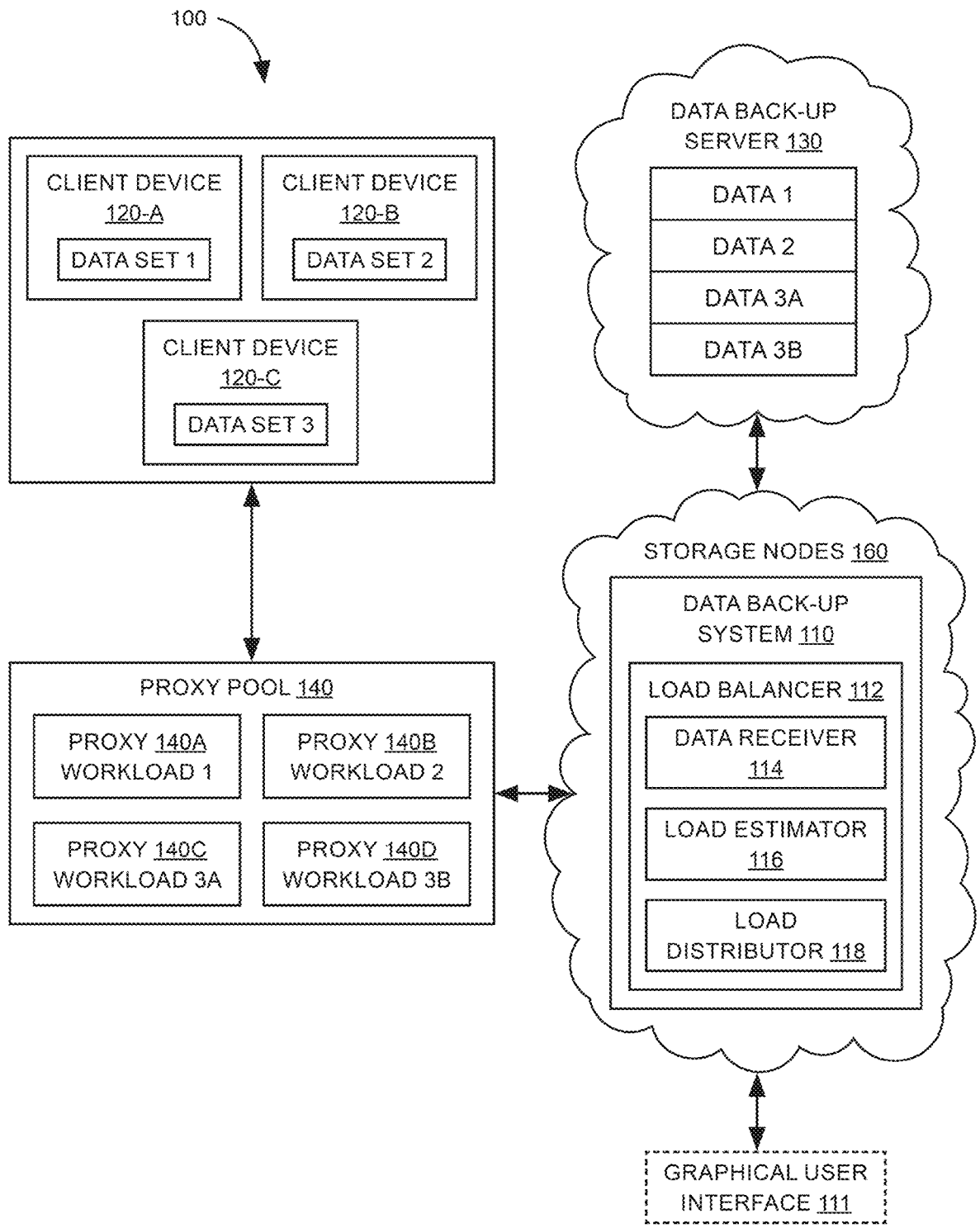
FIG. 2 is a block diagram illustrating an example data back-up system environment, according to some aspects of the present description.

FIG. 2 is a block diagram of an example data back-up environment 100 including the data back-up system 110, in accordance with some embodiments of the present description. FIG. 2 shows three client devices 120A, 102B and 120C for illustration purposes only, and as mentioned earlier, the system environment 100 may include any number of devices. Each of the devices further includes a data set that needs to be backed-up. A shown in FIG. 2, device 120A has dataset 1, device 120B has dataset 2 and device 120C has dataset 3.

The datasets 1, 2 and 3 are backed-up using the data back-up system 110 and the proxy pool 140, wherein the data back-up system 110 is configured to distribute the datasets 1, 2 and 3 across the proxies 140A, 140B, 140C and 140D in the proxy pool 140 as plurality of workloads 1, 2, 3a and 3b. It should be noted that FIG. 2 shows four proxies 140A, 140B, 140C and 140D in the proxy pool 140 for illustration purposes only, and the number of proxies available for back-up may depend on the client.

The data back-up system 110 in example the embodiment illustrated in FIG. 2 is located in storage nodes 160 on the cloud. The data back-up system 110 includes a load balancer 112 configured to distribute the one or more data sets across the plurality of proxies. The load balancer 112 includes a data receiver 114, a load estimator 116, and a load distributor 118. Each of these components is described in detail below.

The data receiver 114 is configured to receive file data corresponding to the one or more data sets from a proxy of the plurality of proxies, wherein the data comprises types of files, number of files, and total size of each file in the one or more data sets. In some embodiments, the data back-up system 110 knows the configuration of each proxy in the proxy pool 140, and the data back-up system 110 is configured to designate one of the proxies to perform sampling of the one or more datasets. For example, in FIG. 2, the data back-up system may designate proxy 140B to perform sampling of the one or more datasets. In some embodiments, the proxy designated as data sampler (e.g., proxy 140B) is configured to initiate random sampling of the datasets to determine types of files based on their extensions. The designated proxy is further configured to determine number of files per file type in a dataset and total size of each file in the dataset.

As mentioned earlier, the data sets may include data of one or more types. Non-limiting examples of data requiring back-up include binary data, videos, static images, audio files, ASCII, etc. Some of the data may be highly compressible, while others may be already compressed. Further, some may require encryption while others may already be encrypted. Moreover, some data may offer deduplication, while some might be unique. Thus, the total back-up load for each dataset may be different, which in turn may affect the speed of the back-up to the data back-up server 130. The term "back-up load" as used herein is indicative of an approximate time taken by a proxy for backing-up the data set to the data back-up server 130. Embodiments of the present description provide for load balancing of the proxies in the proxy pool 140 by using a weighted average load, as described herein below.

The load estimator 116 is configured to estimate a weighted average load of each data set in the one or more data sets based on the number of files, the total size of each file, the compressibility factor for each file type, and the encryption factor for each file type. The load estimator 116 is configured to receive for each dataset: types of files, number of files for each file type, and the total size of each file from the data receiver 114. The load estimator 116 is further configured to determine a compressibility factor and an encryption factor for each file in a dataset based on the file type and size of the file. The load estimator 116 is further configured to assign weights to the compressibility factor and the encryption factor based on the file type, and based on the assigned weights estimated a weighted average load for each dataset. In some embodiments, the load estimator is further configured to estimate the weighted average load based on a deduplication factor.

The load distributor 118 is configured to distribute the one or more data sets as a plurality of workloads across the plurality of proxies based on the weighted average load of each dataset. The load distributor 118 is configured to distribute the one or more data sets approximately equally across the proxies such that the distributed workloads finish almost at the same time with similar use of resources on each proxy during the back-up.

In some embodiments, the data back-up system 110 is configured to task the first proxy in the proxy pool 140 to divide the plurality of workloads among the proxies. The data back-up system 110 is further configured to start the back-up job on all the proxies in parallel once the workloads are distributed approximately equally across the proxies.

The load distributor 118 is further configured to split a data set into two or more workloads to distribute the workloads approximately equally across the proxies, as shown in FIG. 2. In the example embodiment illustrated in the FIG. 2, data set 1 is assigned as workload 1 to proxy 140A, dataset 2 is assigned to proxy 140B as workload 2, and dataset 3 is split into workloads 3a and 3b, which are assigned to proxies 140C and 140D respectively.

In embodiments including a single large dataset, the load distributor 118 may split the large dataset into a plurality of smaller workloads that are backed-up parallelly by the plurality of proxies in the proxy pool, thereby reducing the time taken to back-up. In some embodiments, the load distributor 118 is configured to split a dataset into two or more workloads using a Depth First Search (DFS) method, before distributing the one or more data sets as a plurality of workloads. In such embodiments, a subtree may be defined as a workload by the load distributor 118.

In some embodiments, the load distributor 118 is further configured to distribute the one or more data sets across the plurality of proxies based on one or more of: number of CPUs in each proxy, available memory in each proxy, I/O bandwidth, or network bandwidth.

The load distributor 118 may be further configured to dynamically redistribute the one or more data sets across the plurality of proxies if one or more proxies of the plurality of proxies have finished back-up of a workload originally assigned to them. In some embodiment, the load distributor 118 is configured to dynamically redistribute one or more data sets across the plurality of proxies if one of the proxies has a remaining workload that is above a defined threshold level of the original workload. For example, in some embodiments, if one of the proxies has a workload that is above 10% of the original workload, the load distributor 118 is configured to redistribute this workload across the one or more idles proxies. Thus, enabling a method for load balancing that is dynamic in nature.

Once the workloads are distributed by the load distributor 118, the proxy pool 140 is configured to back-up the workloads 1, 2, 3a, and 3b in the data back-up server 130, as shown in the example embodiment of FIG. 2.

Figure 3:
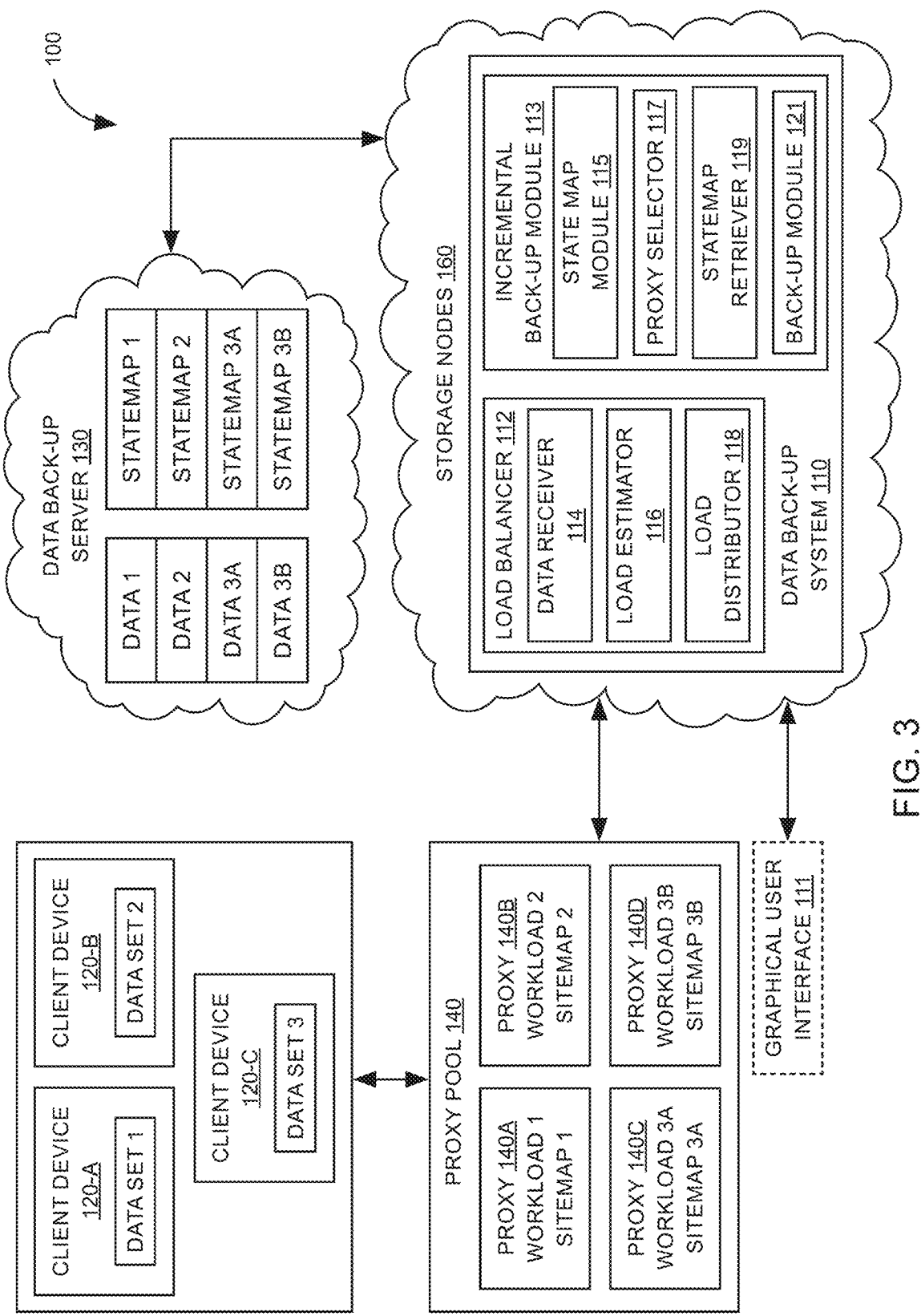
FIG. 3 is a block diagram illustrating an example data back-up system environment, according to some aspects of the present description.

Referring now to FIG. 3, the data back-up system 110 further includes an incremental back-up module 113 configured to perform incremental back-up of one or more workloads of the plurality of workloads by using the proxy pool 140. An incremental data back-up is a type of back-up that copies only data that was changed since the previous back-up. Unlike a full back-up where all data is copied to the back-up storage with every back-up job, after an instance of a full back-up, the incremental approach only allows back up of files that were changed since the most recent back-up. Thus, incremental back-up reduces storage requirements, bandwidth load, and provides the necessary level of data consistency and availability.

In certain embodiments, the data back-up system 110 is configured to perform incremental data back-up based on a statemap The term "statemap" as used herein refers to metadata that provides information about which file is backed up at what time and is useful for incremental back-ups to decide whether the file from the same dataset is newly added or removed or modified. The incremental back-up module includes a statemap module 115, a proxy selector 117, a statemap retriever 119 and a back-up module 119.

The statemap module 115 is configured to save a statemap for each workload of the plurality of workloads onto the data back-up server and onto a corresponding proxy of the plurality of proxies used for latest back-up of each workload. This is further illustrated in FIG. 3, by way of example, where the statemaps corresponding to workloads 1, 2, 3a and 3b are stored in the data back-up server 130 as well as along with corresponding proxies in the proxy pool 140. By storing the statemap on the corresponding proxy along with the data back-up server 130, the data back-up system 110 mitigates the need for downloading it at the time of incremental back-up, thus improving the speed and reducing data usage for the incremental back-up.

The statemap module 115 is further configured to maintain a statemap-proxy database based on a latest statemap for each workload and the corresponding proxy used for the latest back-up (either full or incremental back-up) of each workload. Thus, for the example illustrated in FIG. 0.3, the statemap module 115 would maintain a statemap-proxy database where the statemap 1 is mapped with proxy 140A, statemap 2 is mapped with proxy 140B, and so on. This provides for an affinity map between the latest statemap and the last proxy that uploaded the workload to the data back-up server 130. As described below, this affinity map can be used by the data back-up system 110 via the proxy selector 117 to assign any future incremental back-ups to the same proxy that performed the previous back-up.

The proxy selector 117 is configured to select a proxy from the plurality of proxies for performing the incremental back-up for a particular workload. The proxy selector 117 is further configured to query the statemap-proxy database (maintained by the statemap module 115) to identify the proxy that performed the latest back-up (either full or incremental back-up) for that particular workload, and select the identified proxy for preforming the incremental back-up if the identified proxy is available for incremental back-up.

For example, for the embodiment illustrated in FIG. 3, for incremental back-up of workload 3a, the proxy selector 117 would query the statemap-proxy database and identify proxy 140C as the proxy that performed the latest back-up. If proxy 140C is available then the proxy selector 117 would select proxy 140C for incremental back-up. In such instances, the selected proxy (e.g., proxy 140C) would already have the latest statemap stored on the proxy and back-up module 121 is configured to initiate incremental back-up based on the latest statemap.

If the identified proxy is not available (e.g., it's not functional etc.), the proxy selector 117 is further configured to select a new proxy for preforming the incremental back-up. In some embodiments, the proxy selector 117 is configured to select a new proxy based on a load balancing technique implemented by the load balancer 112 of the data back-up system 110. In such instances, the load balancer 112 would distribute the incremental back-up of the workloads using the load balancing technique as described herein above with reference to FIG. 2.

For example, for the embodiment illustrated in FIG. 3, for incremental back-up of workload 3*b*, the proxy selector 117 would query the statemap-proxy database and identify proxy 140D as the proxy that performed the latest back-up. However, if proxy 140D is not available then the proxy selector 117 would select a new proxy (say proxy 140B) for incremental back-up. In such instances, the selected proxy (e.g, proxy 140B) wouldn't have the latest statemap corresponding to the particular workload, and the latest statemap may need to be retrieved onto the selected new proxy (e.g, proxy 140B) to initiate the incremental back-up by the back-up module 121.

The statemap retriever 119 is configured to retrieve a latest statemap corresponding to the particular workload onto the selected proxy if the selected proxy is different from a proxy that performed the latest back-up for that particular workload. In some embodiments, the statemap retriever 119 is further configured to fetch the latest statemap onto the selected new proxy from the proxy that performed the latest back-up by performing peer-to-peer exchange. In some embodiments, the statemap retriever 119 is configured to use IPC to perform statemap exchange from the proxy which performed the previous back-up to the newly identified proxy. This makes exchange of the statemap much quicker than performing a statemap download from the data back-up server 130.

In some embodiments, the statemap retriever 119 is further configured to download the latest statemap onto the selected new proxy from the data back-up server 130 if the proxy that performed the latest back-up is not functional. Thus, the system provides for a a high amount of fault tolerance by making the statemap metadata available to any proxy for an incremental back-up.

For example, in instances where the proxy selector has selected proxy 140B for incremental back-up of workload 3*b*, the statemap retriever 119 is configured to first try and retrieve the latest statemap (e.g., statemap 3*b*) corresponding to workload 3*b* from the last proxy that performed back-up (in this case proxy 140D). However, if the statemap 3*b* is not available from proxy 140D, then the statemap retriever 119 is further configured to download the statemap 3*b* from the data back-up server 130 onto the proxy 140B.

As mentioned earlier, the incremental back-up module 113 further includes a back-up module 121. The back-up module 121 is configured to initiate the incremental back-up by the selected proxy based on the latest state-map. The selected proxy may be the same proxy that performed the latest back-up (either full or incremental back-up) or may be a new proxy selected based on a load balancing mechanism. Further, the latest statemap may already be present on the selected proxy or the latest statemap may be retrieved from a previous proxy or downloaded from the data back-up server 130.

Figure 4:
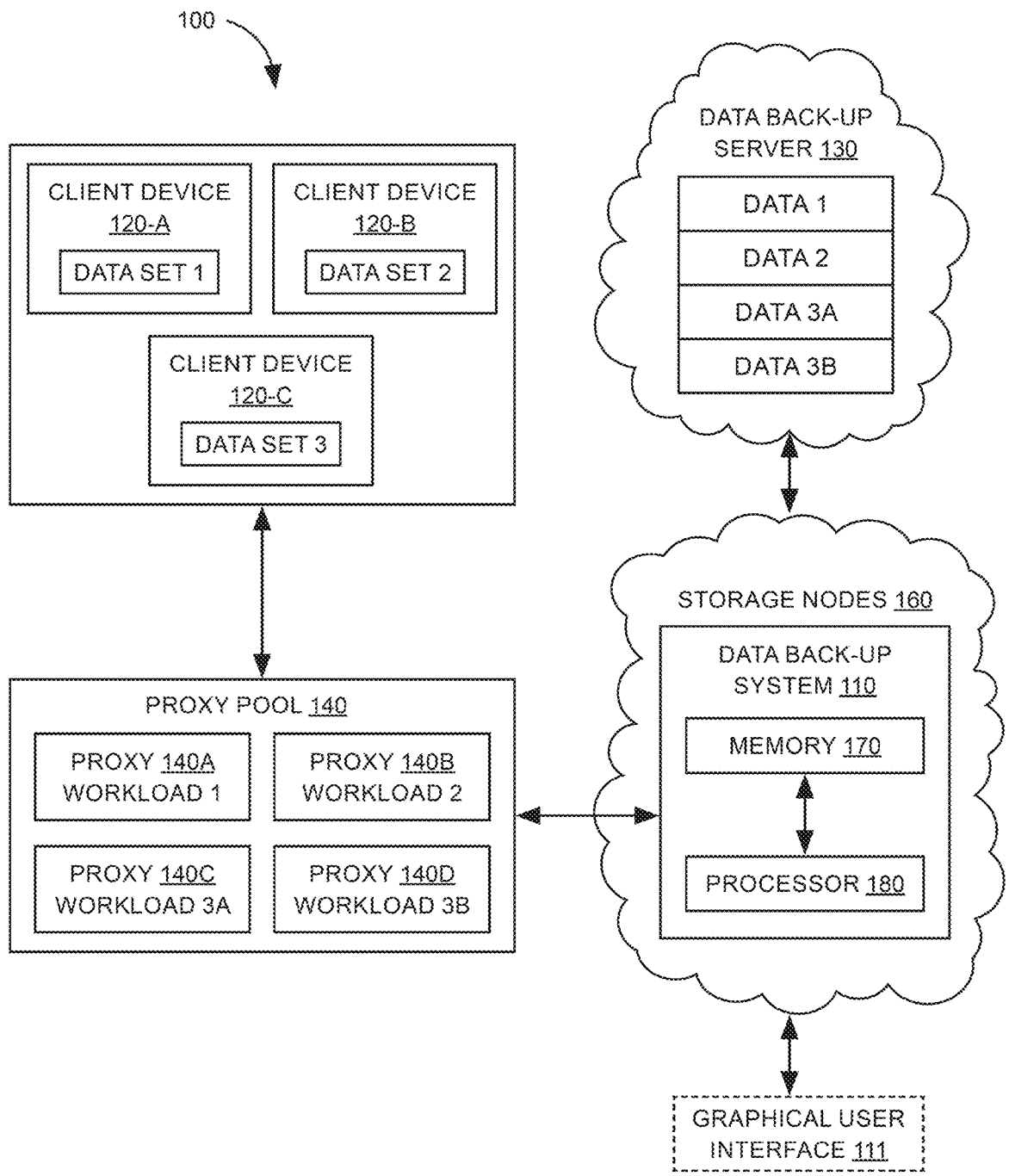
FIG. 4 is a block diagram illustrating an example data back-up system environment, according to some aspects of the present description.

Referring now to FIG. 4, a data back-up environment 100, according to some embodiments of the present description, is presented. The system environment 100 includes a data back-up system 110 located in the storage nodes 160 on the cloud, one or more client devices 120 (120A, 120B . . . 120N), a data back-up server 130, and a proxy pool 140. The system environment 100 may be configured to back-up data sets from the one or more client devices 120 in the data back-up server 130 using the data back-up system 110 and the proxy pool 140. The data back-up system 110 includes a memory 170 storing one or more processor-executable routines and a processor 180 communicatively coupled to the memory 170. The processor 180 is configured to execute the processor-executable routines to perform the steps illustrated in the flow-chart of FIG. 5.

Figure 5:
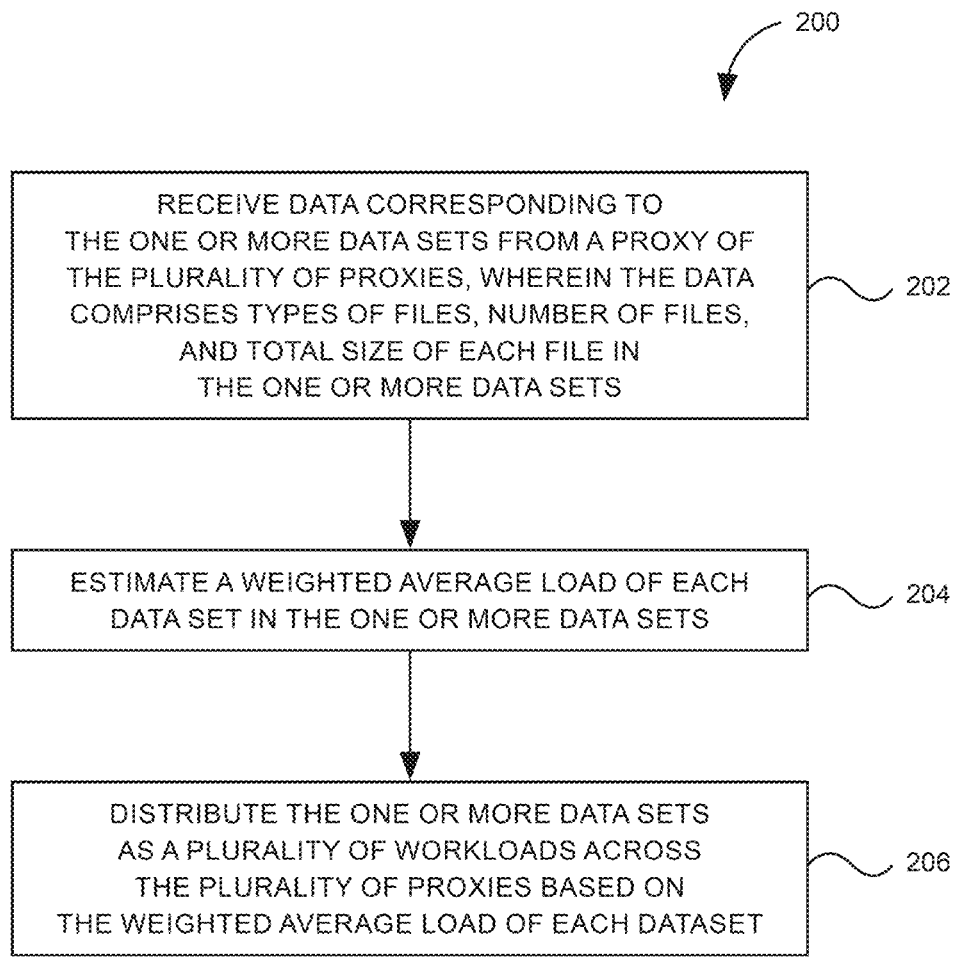
FIG. 5 is a flow chart illustrating a method for data back-up, according to some aspects of the present description.

FIG. 5 is a flowchart illustrating a method 200 for backing-up one or more data sets from one or more devices to a data back-up server using a proxy pool including a plurality of proxies. The method 200 may be implemented using the data back-up system 110 of FIGS. 1-4, according to some aspects of the present description. Each step of the method 200 is described in detail below.

The method 200 includes, at block 202, receiving file data corresponding to the one or more data sets from a proxy of the plurality of proxies, wherein the file data comprises types of files, number of files, and total size of each file in the one or more data sets. In some embodiments, block 202 includes designating a proxy of the plurality of proxies to perform random sampling of the datasets to determine types of files based on their extensions. The proxy designating as data sampler may further determine number of files per file type in a dataset and total size of each file in the dataset.

At block 204, the method 200 includes estimating a weighted average load of each data set in the one or more data sets based on the number of files, the total size of each file, a compressibility factor for each file type, and an encryption factor for each file type. Block 204 further includes determining a compressibility factor and an encryption factor for each file in a dataset based on the size of the file. In some embodiments, block 204 further includes assigning weights to the compressibility factor and the encryption factor based on the file type, and based on the assigned weights estimating a weighted average load for each dataset.

The method 200, further includes, at block 206, distributing the one or more data sets as a plurality of workloads across the plurality of proxies based on the weighted average load of each dataset. In some embodiments, the method includes, at block 206. distributing the one or more data sets approximately equally across the proxies such that the distributed workloads finish almost at the same time with similar use of resources on each proxy during the back-up.

In some embodiments, block 206 further includes splitting a dataset into two or more workloads using a Depth First Search (DFS) method, before distributing the one or more data sets as a plurality of workloads across the plurality of proxies. In such embodiments, a subtree may be defined as a workload.

In some embodiments, block 206, further includes distributing the one or more data sets into a plurality of workloads across the plurality of proxies based on one or more of number of CPUs in each proxy, available memory in each proxy, I/O bandwidth, or network bandwidth.

The method 200 may further include dynamically redistributing the one or more data sets across the plurality of proxies if one or more proxies of the plurality of proxies have completed back-up of a workload originally assigned to them. In some embodiments, method 200 includes dynamically redistributing one or more data sets across the plurality of proxies if one of the proxies has a remaining workload that is above a defined threshold level of the original workload. For example, in some embodiments, if one of the proxies has a workload that is above 10% of the original workload, the method 200 includes redistributing this workload across the one or more idles proxies. Thus, enabling a method for load balancing that is dynamic in nature.

FIG. 6 illustrates an example embodiment where three different datasets are distributed into four different workloads according to the systems and methods described herein. As shown in Table 10, dataset 11 includes text files (.txt extension), dataset 12 includes compressed files (.zip or .gzip extension), image file (.jpeg extension) and video file (.mpeg extension), and dataset 13 includes data files (.dat extension). Table 10 further includes their file size 15 (in Bytes) and compressibility 16 based on file type 14

A compression factor 17 is assigned to each file based on the file size 15. In the example embodiment illustrated in FIG. 6, a compression factor of 1 is estimated for a file having a file size of about 1 MB and a compression factor of 1024 is estimated for a file having a file size of about 1 GB. A compression weight 18 is further assigned to each file based on the compressibility 16. A weighted average compression weight 19 is calculated for each file based on the compression factor 17 and the assigned compression weight 18.

Similarly, an encryption factor 20 is assigned to each file based on the file size 15. In the example embodiment illustrated in FIG. 6, an encryption factor of 1 is estimated for a file having a file size of about 1 MB and an encryption factor of 1024 is estimated for a file having a file size of about 1 GB. For the files shown in FIG. 6, as encryption weight is 1, the encryption factor and the weighted average encryption weight are the same.

Table 10 further shows the estimated weighted average load 21 of each dataset. As datasets 1 and 2 have substantially similar weighted average load 21 they are each individually assigned to proxies 140A and 140B. Further, as shown in Table 10, as dataset 3 has a substantially larger weighted average load 21 compared to datasets 1 and 2, the dataset 3 is split into two and assigned to two different proxies (140C and 140D) according to the method describe herein. As mentioned earlier, the data set 3 may be split based on DFS method and a subtree may be assigned as an individual workload.

Figure 7:
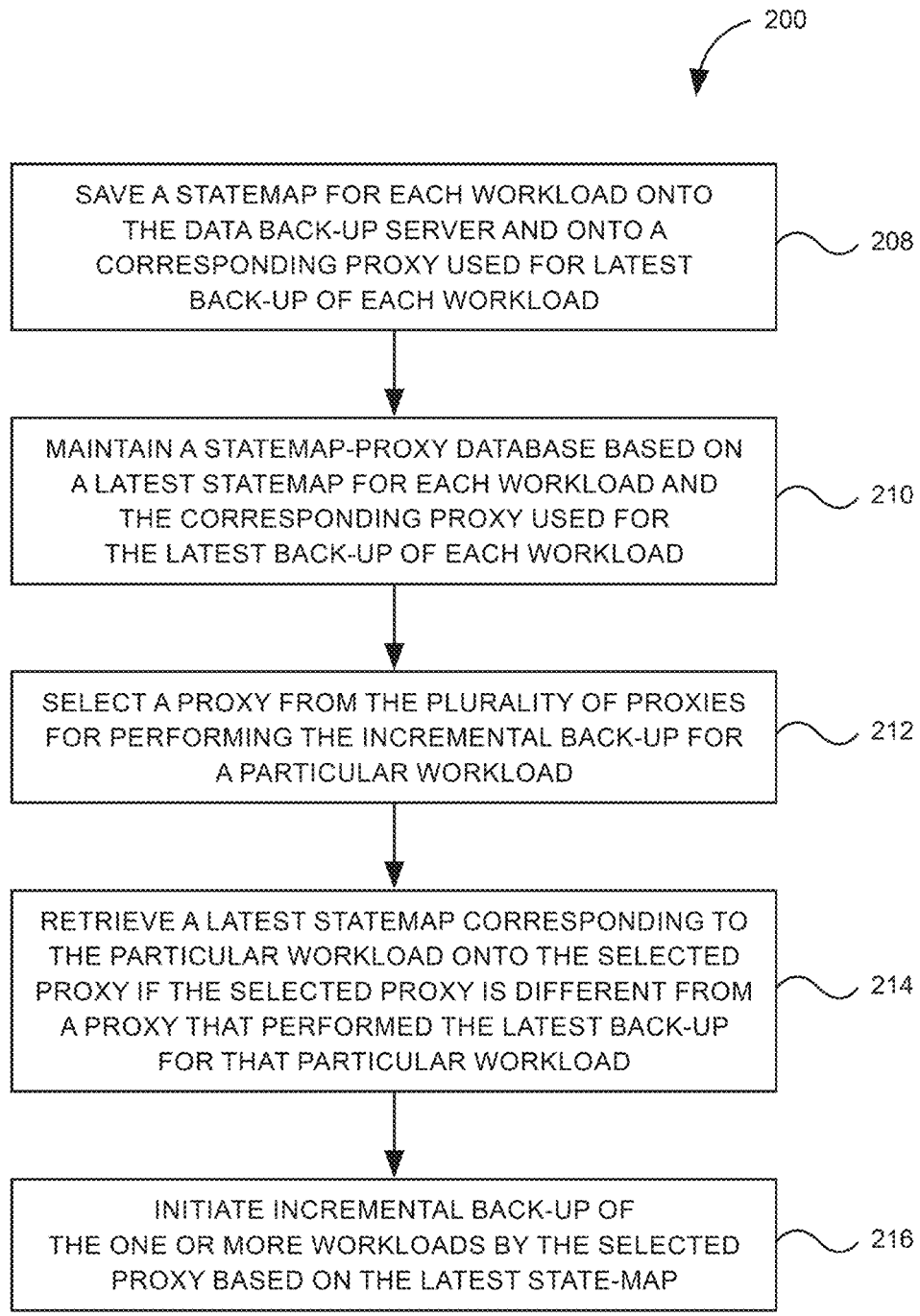
FIG. 7 is a flow chart illustrating a method for data back-up, according to some aspects of the present description.

Referring now to FIG. 7, the method 200 further includes performing incremental back-up of one or more workloads of the plurality of workloads by using the proxy pool. The method 200 includes, at block 208, saving a statemap for each workload of the plurality of workloads onto the data back-up server and onto a corresponding proxy of the plurality of proxies used for latest back-up of each workload. The method 200 further includes, at block 210, maintaining a statemap-proxy database based on a latest statemap for each workload and the corresponding proxy used for the latest back-up of each workload.

The method 200, further includes, at block 212, selecting a proxy from the plurality of proxies for performing the incremental back-up for a particular workload. In some embodiments, block 212 includes querying the statemap-proxy database to identify the proxy that performed the latest back-up for that particular workload. Block 212 further includes selecting the identified proxy for preforming the incremental back-up if the identified proxy is available for incremental back-up, or selecting a new proxy for preforming the incremental back-up if the identified proxy is not available. In some embodiments, block 212 includes selecting a new proxy based on a load balancing technique of FIG. 5.

The method 200, further includes, at block 214, retrieving a latest statemap corresponding to the particular workload onto the selected proxy if the selected proxy is different from a proxy that performed the latest back-up for that particular workload. In some embodiments, block 214 includes fetching the latest statemap onto the selected new proxy from the proxy that performed the latest back-up by performing peer-to-peer exchange. In some embodiments, block 214 includes using IPC to perform statemap exchange from the proxy which performed the previous back-up to the newly identified proxy. This makes exchange of the statemap much quicker than performing a statemap download from the data back-up server 130.

In some embodiments, block 214 includes downloading the latest statemap onto the selected new proxy from the data back-up server if the proxy that performed the latest back-up is not functional. Thus, the method 200 provides for a a high amount of fault tolerance by making the statemap metadata available to any proxy for an incremental back-up. The method 200, further includes, at block 216, initiating incremental back-up of the one or more workloads by the selected proxy based on the latest state-map.

Systems and methods of the present description provide for load balancing in a round robin manner using a proxy pool. The proxy pool is capable of handling multiple datasets as well as a large dataset with large number of files. Thus, enabling faster data back-up as compared to data back-up using a single proxy. Further, systems and methods of the present description provide for affinity of the statemap with the latest proxy that performed latest back-up. By creating this affinity map, the present technique enables use of the same proxy for future incremental back-ups and avoids download or transfer of statemap during the following incremental back-up. Furthermore, in case the proxy selected for the following incremental back-up is different from the previous proxy, peer to peer statemap exchange may be performed. Alternatively, if peer to peer is not possible because the previous proxy having the latest statemap is not functional, the statemap may be downloaded from the data back-up server. Thus, providing a high amount of fault tolerance by making the statemap metadata available to any proxy for an incremental back-up.

The systems and methods described herein may be partially or fully implemented by a special purpose computer system created by configuring a general-purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium, such that when run on a computing device, cause the computing device to perform any one of the aforementioned methods. The medium also includes, alone or in combination with the program instructions, data files, data structures, and the like. Non-limiting examples of the non-transitory computer-readable medium include, but are not limited to, rewriteable non-volatile memory devices (including, for example, flash memory devices, erasable programmable read-only memory devices, or a mask read-only memory devices), volatile memory devices (including, for example, static random access memory devices or a dynamic random access memory devices), magnetic storage media (including, for example, an analog or digital magnetic tape or a hard disk drive), and optical storage media (including, for example, a CD, a DVD, or a Blu-ray Disc). Examples of the media with a built-in rewriteable non-volatile memory, include but are not limited to memory cards, and media with a built-in ROM, including but not limited to ROM cassettes, etc. Program instructions include both machine codes, such as produced by a compiler, and higher-level codes that may be executed by the computer using an interpreter. The described hardware devices may be configured to execute one or more software modules to perform the operations of the above-described example embodiments of the description, or vice versa.

Non-limiting examples of computing devices include a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to the execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Figure 8:
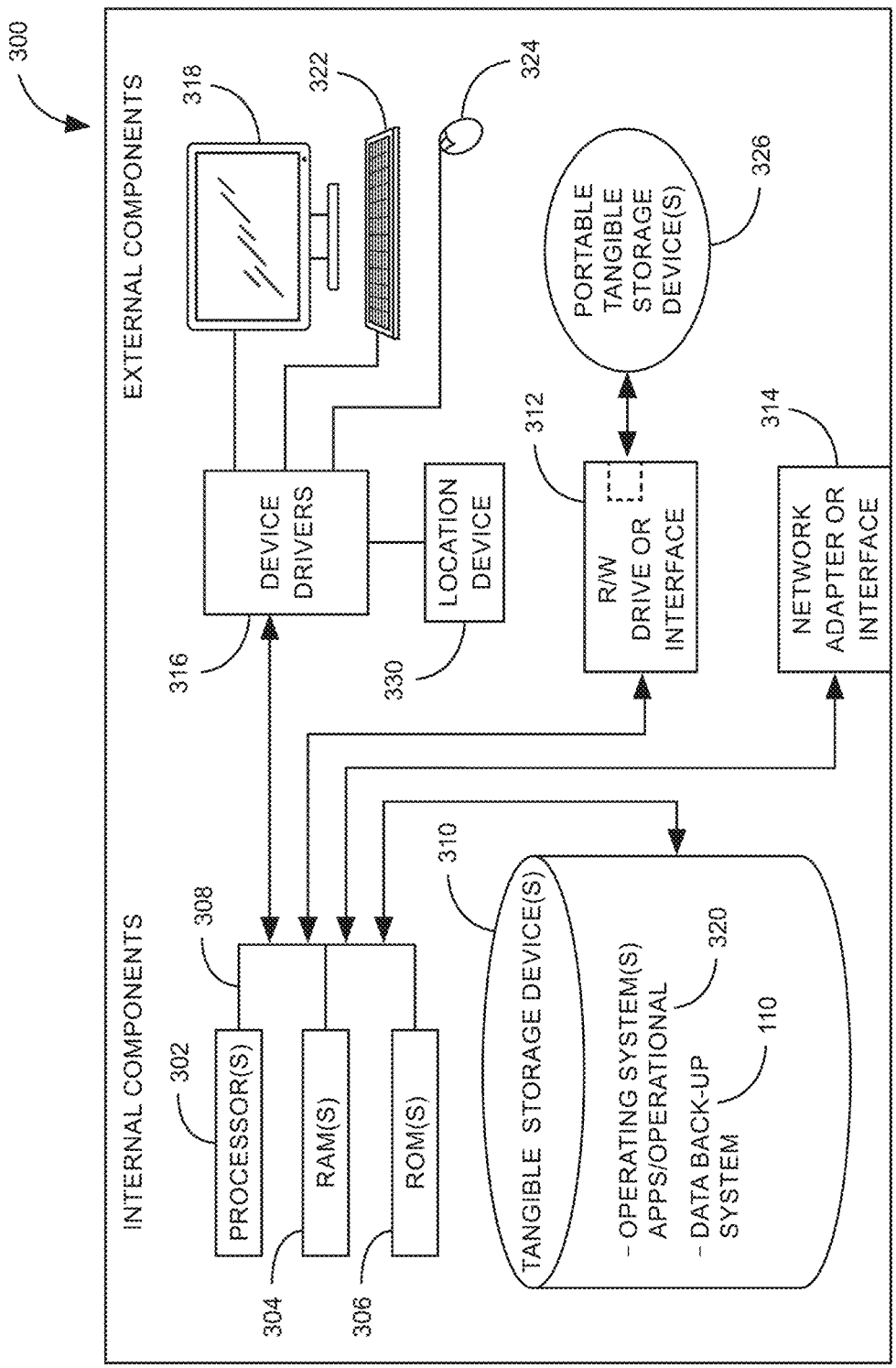
FIG. 8 is a block diagram illustrating an example computer system, according to some aspects of the present description.

One example of a computing system 300 is described below in FIG. 8. The computing system 300 includes one or more processor 302, one or more computer-readable RAMs 304 and one or more computer-readable ROMs 306 on one or more buses 308. Further, the computer system 308 includes a tangible storage device 310 that may be used to execute operating systems 320 and the data back-up system 110. Both, the operating system 320 and data back-up system 110 are executed by processor 302 via one or more respective RAMs 304 (which typically includes cache memory). The execution of the operating system 320 and/or the system 110 by the processor 302, configures the processor 302 as a special-purpose processor configured to carry out the functionalities of the operation system 320 and/or the data back-up system 110, as described above. In some embodiments, the processor 302 is further configured to execute the one or more devices 120, the proxy pool 140, the storage nodes 160, or combinations thereof.

Examples of storage devices 310 include semiconductor storage devices such as ROM 506, EPROM, flash memory or any other computer-readable tangible storage device that may store a computer program and digital information.

Computer system 300 also includes a R/W drive or interface 312 to read from and write to one or more portable computer-readable tangible storage devices 326 such as a CD-ROM, DVD, memory stick or semiconductor storage device. Further, network adapters or interfaces 314 such as a TCP/IP adapter cards, wireless Wi-Fi interface cards, or 3G or 4G wireless interface cards or other wired or wireless communication links are also included in the computer system 300.

In one example embodiment, the data back-up system 110 may be stored in tangible storage device 310 and may be downloaded from an external computer via a network (for example, the Internet, a local area network or another wide area network) and network adapter or interface 314.

Computer system 300 further includes device drivers 316 to interface with input and output devices. The input and output devices may include a computer display monitor 318, a keyboard 322, a keypad, a touch screen, a computer mouse 324, and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

While only certain features of several embodiments have been illustrated and described herein, many modifications and changes will occur to those skilled in the art. It is, therefore, to be understood that the appended claims are intended to cover all such modifications and changes as fall within the scope of the invention and the appended claims.

The invention claimed is:

1. A data back-up system configured to incrementally back-up at a plurality of back-ups a plurality of data sets from one or more devices to a data back-up server by using a proxy pool, comprising a plurality of proxies, the data back-up system being configured to:
receive, for each of the data sets, an indication of one or more types of a plurality of different files therein, a number of the files, and a total size of each of the files;
estimate a weighted average load of each of the data sets based on the number, the total sizes, a compressibility factor for each of the one or more types, and an encryption factor for each of the one or more types, wherein each of the estimates indicates a time for performing the back-up of the data set, and wherein at least one of the data sets comprises one or more of the files that is different from at least one of the files corresponding to another one of the data sets;

identify, for each of a plurality of workload, a statemap comprising metadata that provides information about which file is backed up at what time, wherein the metadata allows for a determination of whether the file from the same data set is newly added, removed, or modified;

identify, for each of the workloads, a first proxy of the plurality of proxies, wherein the first proxy is available for a next one of the back-ups incrementally of at least one of the one or more data sets, and wherein the first proxy precludes a download or transfer of the identified statemap otherwise performed during a next one back-up; and distribute one or more of the data sets as a plurality of workloads across the proxies, each of the distributions being based on the weighted average load of the respective data set, wherein each of the workloads is uploaded to the back-up server by the first proxy.

2. The data back-up system of claim 1, wherein the data back-up system is further configured to split a data set into two or more workloads using a Depth First Search (DFS) method, before distributing the one or more data sets as the workloads across the proxies.

3. The data back-up system of claim 1, wherein the data back-up system is further configured to distribute the one or more data sets across the proxies based on one or more of: a number of CPUs in each proxy, an available memory in each proxy, I/O bandwidth, or network bandwidth.

4. The data back-up system of claim 1, wherein the data back-up system is further configured to dynamically redistribute the one or more data sets across the proxies if one or more of the proxies have finished back-up of a workload originally assigned to them.

5. The data back-up system of claim 1, wherein each of the workloads is further uploaded to a selected proxy;
  wherein the identifications are maintained at a statemap-proxy database; and
  wherein a latest statemap is retrieved corresponding to a particular workload onto the selected proxy if the selected proxy is different from a previous proxy that performed a respectively latest back-up for that particular workload.

6. The data back-up system of claim 5, wherein the data back-up system is further configured to:
  query the statemap-proxy database to identify the proxy that performed the latest back-up for that particular workload, and
  select a new proxy, upon the identified proxy not being available at a next increment thereof.

7. The data back-up system of claim 6, wherein the data back-up system is further configured to:
  fetch the latest statemap onto the selected new proxy from the proxy that performed the latest back-up by performing peer-to-peer exchange, or
  download the latest statemap onto the selected new proxy from the data back-up server if the proxy that performed the latest back-up is not functional.

8. A data back-up system configured to incrementally back-up at a plurality of back-ups a plurality of data sets from one or more devices to a data back-up server using a proxy pool comprising a plurality of proxies, the data back-up system comprising:

a memory storing a plurality of processor-executable instructions; and a processor communicatively coupled to the memory, the processor being configured to execute the processor-executable instructions to:
  receive, for each of the data sets, an indication of one or more types of a plurality of different files therein, a number of the files, and a total size of each of the files;
  estimate a weighted average load of each of the data sets based on the number, the total sizes, a compressibility factor for each of the one or more types, and an encryption factor for each of the one or more types, wherein each of the estimates indicates a time for performing the back-up of the data set, and wherein at least one of the data sets comprises one or more of the files that is different from at least one of the files corresponding to another one of the data sets;
  identify, for each of a plurality of workload, a statemap comprising metadata that provides information about which file is backed up at what time, wherein the metadata allows for a determination of whether the file from the same data set is newly added, removed, or modified;
  identify, for each of the workloads, a first proxy of the plurality of proxies, wherein the first proxy is available for a next one of the back-ups incrementally of at least one of the one or more data sets, and wherein the first proxy precludes a download or transfer of the identified statemap otherwise performed during a next one back-up; and
  distribute one or more of the data sets as a plurality of workloads across the proxies, each of the distributions being based on the weighted average load of the respective data set, wherein each of the workloads is uploaded to the back-up server by the first proxy.

9. The data back-up system of claim 8, wherein the processor is further configured to split a data set into two or more workloads using a Depth First Search (DFS) method, before distributing the one or more data sets as the workloads across the proxies.

10. The data back-up system of claim 8, wherein the processor is further configured to dynamically redistribute the one or more data sets across the proxies if one or more of the proxies have completed back-up of a workload originally assigned to them.

11. The data back-up system of claim 8, wherein each of the workloads is further uploaded to a selected proxy;
  wherein the identifications are maintained at a statemap-proxy database; and
  wherein a latest statemap is retrieved corresponding to a particular workload onto the selected proxy if the selected proxy is different from a previous proxy that performed a respectively latest back-up for that particular workload.

12. The data back-up system of claim 11, wherein the processor is further configured to execute the one or more processor-executable instructions to:
  query the statemap-proxy database to identify the proxy that performed the latest back-up for that particular workload, and
  select a new proxy, upon the identified proxy not being available at a next increment thereof.

13. The data back-up system of claim 12, wherein the processor is further configured to execute the one or more processor-executable instructions to:
    fetch the latest statemap onto the selected new proxy from the proxy that performed the latest back-up by performing peer-to-peer exchange; or
    download the latest statemap onto the selected new proxy from the data back-up server if the proxy that performed the latest back-up is not functional.

14. A method for incrementally backing-up at a plurality of back-ups a plurality of data sets from one or more devices to a data back-up server using a proxy pool comprising a plurality of proxies, the method comprising:
    receiving, for each of the data sets, an indication of one or more types of a plurality of different files therein, a number of the files, and a total size of each of the files;
    estimating a weighted average load of each of the data sets based on the number, the total sizes, a compressibility factor for each of the one or more types, and an encryption factor for each of the one or more types, wherein each of the estimates indicates a time for performing the back-up of the data set, and wherein at least one of the data sets comprises one or more of the files that is different from at least one of the files corresponding to another one of the data sets;
    identifying, for each of a plurality of workload, a statemap comprising metadata that provides information about which file is backed up at what time, wherein the metadata allows for a determination of whether the file from the same data set is newly added, removed, or modified;
    identifying, for each of the workloads, a first proxy of the plurality of proxies, wherein the first proxy is available for a next one of the back-ups incrementally of at least one of the one or more data sets, and wherein the first proxy precludes a download or transfer of the identified statemap otherwise performed during a next one back-up; and
    distributing one or more of the data sets as a plurality of workloads across the proxies, each of the distributions being based on the weighted average load of the respective data set, wherein each of the workloads is uploaded to the back-up server by the first proxy.

15. The method of claim 14, further comprising:
    splitting a data set into two or more workloads using a Depth First Search (DFS) method, before distributing the one or more data sets as the workloads across the proxies.

16. The method of claim 14, wherein distributing the one or more data sets into a plurality of workloads across the proxies is further based on one or more of a number of CPUs in each proxy, an available memory in each proxy, I/O bandwidth, or network bandwidth.

17. The method of claim 14, further comprising:
    dynamically redistributing the one or more data sets across the proxies if one or more of the proxies have completed back-up of a workload originally assigned to them.

18. The method of claim 14, wherein each of the workloads is further uploaded to a selected proxy;
    wherein the identifications are maintained at a statemap-proxy database; and
    wherein a latest statemap is retrieved corresponding to a particular workload onto the selected proxy if the selected proxy is different from a previous proxy that performed a respectively latest back-up for that particular workload.

19. The method of claim 18, wherein selecting a proxy from the proxies for performing the incremental back-up for a particular workload comprises:
    querying the statemap-proxy database to identify the proxy that performed the latest back-up for that particular workload, and
    selecting a new proxy, upon the identified proxy not being available at a next increment thereof.

20. The method of claim 19, wherein retrieving a latest statemap corresponding to the particular workload onto the selected proxy comprises:
    fetching the latest statemap onto the selected new proxy from the proxy that performed the latest back-up by performing peer-to-peer exchange, or
    downloading the latest statemap onto the selected new proxy from the data back-up server if the proxy that performed the latest back-up is not functional.

* * * * *